United States Patent [19]

Scully

[11] 4,053,783
[45] Oct. 11, 1977

[54] X-RAY LASER UTILIZING GAS JET
[75] Inventor: Marlan O. Scully, Tucson, Ariz.
[73] Assignee: University Patents, Inc., Stamford, Conn.
[21] Appl. No.: 518,270
[22] Filed: Oct. 29, 1974
[51] Int. Cl.² ............................................. H01J 35/00
[52] U.S. Cl. ................................. 250/493; 331/94.5 G
[58] Field of Search ..................... 331/94.5 G; 250/493
[56] References Cited
U.S. PATENT DOCUMENTS

| | | | |
|---|---|---|---|
| 3,541,372 | 11/1970 | Omura et al. | 250/493 X |
| 3,749,909 | 7/1973 | Hill | 250/493 X |
| 3,813,555 | 5/1974 | Viecelli | 250/493 |

Primary Examiner—Alfred E. Smith
Assistant Examiner—T. N. Grigsby
Attorney, Agent, or Firm—Martin Novack

[57] ABSTRACT

An apparatus for generating stimulated x-ray emission. In accordance with the invention there is provided a means for producing a gas jet target capable of population inversion. Also provided is a means for generating an ion beam and a means for scanning the ion beam longitudinally along the gas jet so as to cause emission therefrom. The scanning speed is established as being substantially equal to the wavefront velocity of the emission; i.e., the speed of light. A hydrogen gas jet overcomes problems encountered using a thin hydrogen-rich foil. The hydrogen jet is not destroyed by the ion beam and the problem of making a suitable thin foil is eliminated. Also, by employing an appropriate beam density, the Doppler width is reduced as compared to the foil so that gain improvement can be achieved.

5 Claims, 1 Drawing Figure

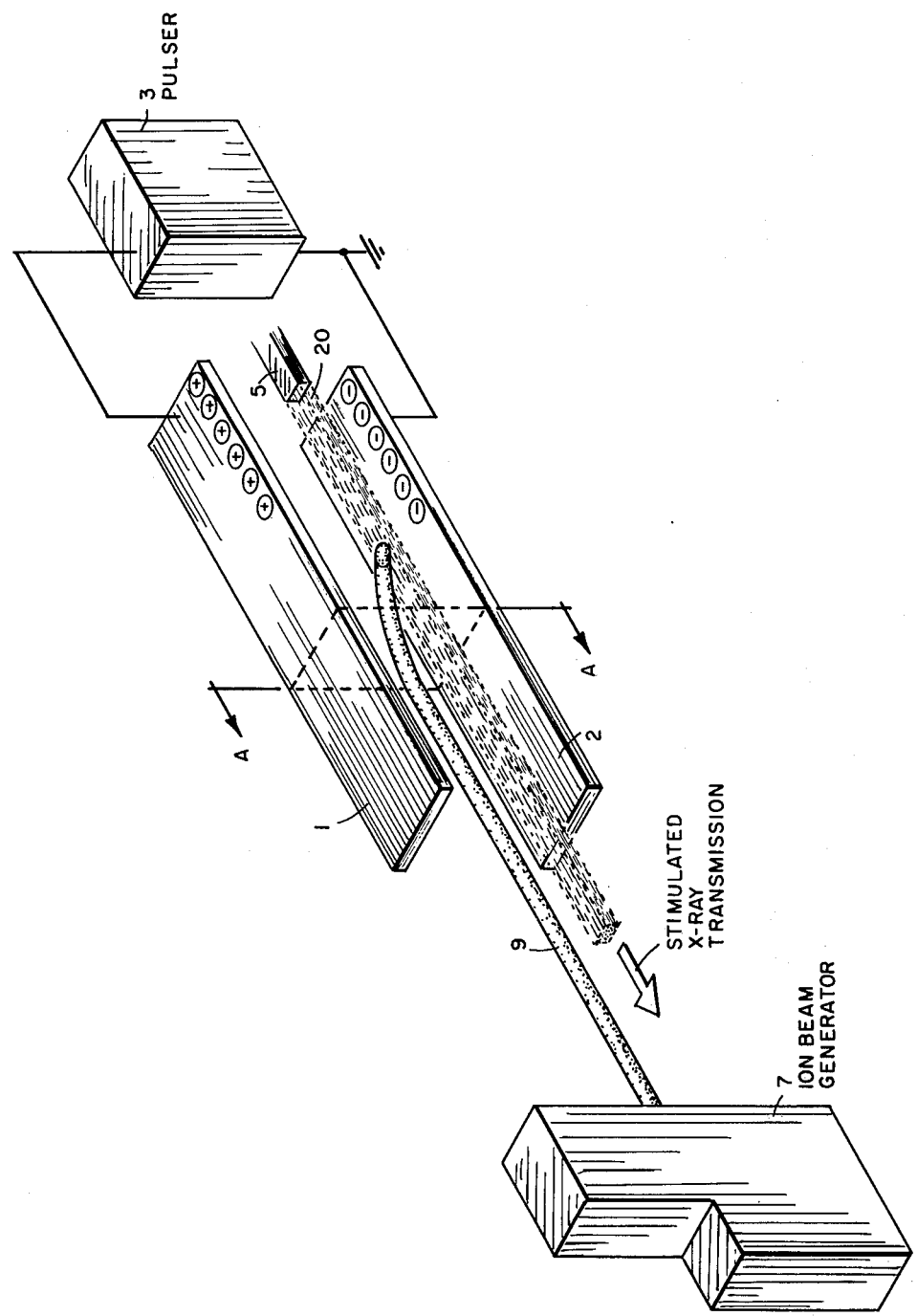

X-RAY LASER UTILIZING GAS JET

BACKGROUND OF THE INVENTION

This invention relates to the field of stimulated x-ray emission and, more particularly, to the field of x-ray emission caused by a lasing type of action.

There is a recognized need for a coherent x-ray generator, but the short life of the excited state of atoms which emit x-rays has presented a problem difficult to overcome. Recently, there have been developed techniques for overcoming the effects of very short spontaneous emission lifetimes by causing a population inversion to sweep along the lasing direction at the speed of light. In the copending U.S. application Ser. No. 393,293 of W. B. McKnight et al., filed Aug. 30, 1973 and entitled "X-Ray Laser," there is disclosed a system wherein an ion beam of completely stripped nuclei, such as $He^{++}$, $Li^{+++}$, etc., is passed through a foil so as to effect resonant charge pickup in an excited state. The stripped nuclei are swept across the foil target at the speed of light. When the beam strikes the foil target, a population inversion in the states between which laser action occurs is established by means of beam foil excitation. The foil is located in one of the two plates which are aligned parallel to the incident direction of the beam. A voltage pulse source is connected to the end of the two plates so as to cause a voltage pulse to travel down the plates at the speed of light. The resultant electric field causes deflection of the beam onto the negative plate where the thin foil is located, so that the beam sweeps along and into the foil at the same speed as the velocity of propagation of the wavefront of stimulated emission. In this manner, a volume element with a large density of excited states on the exit side of the foil is produced due to the resonant charge exchange between the beam and the hydrogen in the foil. Since the beam sweeps downstream in coincidence with the stimulated emission wavefront, the traveling stimulated emission constitutues an x-ray laser action.

While the described technique is considered promising, there are problems associated with the production and use of the thin hydrogen-rich foil strip. The foil thickness needed to maximize the desired population inversion is so thin that such foils are difficult to make which are still thick enough so that multiple scattering will give a suitable Doppler width. In addition, the lifetime of the foils are short since they are destroyed by the impinging ion beam.

It is an object of this invention to overcome the disadvantages set forth.

SUMMARY OF THE INVENTION

The present invention is directed to an apparatus for generating stimulated x-ray emission. In accordance with the invention there is provided a means for producing a gas jet target capable of population inversion. Also provided is a means for generating an ion beam and a means for scanning the ion beam longitudinally along the gas jet so as to cause emission therefrom. The scanning speed is established as being substantially equal to the wavefront velocity of the emission; i.e., the speed of light. A hydrogen gas jet overcomes problems encountered using a thin hydrogen-rich foil. The hydrogen jet is not destroyed by the ion beam and the problem of making a suitable thin foil is eliminated. Also, by employing an appropriate beam density, the Doppler width is reduced as compared to the foil so that gain improvement can be achieved.

Further features and advantages of the invention will become more readily apparent from the following detailed description when taken in conjunction with accompaning drawing.

BRIEF DECRIPTION OF THE DRAWING

The FIGURE shows a diagramatic illustration of the preferred embodiment of the invention.

DESCRIPTION OF THE PREFERRED EMBODIMENT

Referring to the FIGURE, there is shown two plates 1 and 2 of a strip transmission line. Connected to the ends of these plates is a high voltage pulse source, which may be any suitable pulse voltage source having a high voltage output, for example $10^4$ v. A source of hydrogen gas, represented by nozzle 5, is disposed near the plate and oriented to direct a jet of hydrogen gas 20 adjacent the inner surface of the lower potential plate 2 and parallel to the plate 2.

Ion beam generator 7 produces an ion beam, for example a beam of completely stripped nuclei such as $He^{++}$, $Li^{+++}$, etc.. Suitable ion beam generators are known in the art. For example, for the production of the $He^{++}$ beam a duoplasmatron can be used to produce a beam of $He^+$. This beam is then accelerated to several hundred kev and then put through a stripping foil, where a fraction of the $He^+$ ions will be converted into $He^{++}$. The beam is then decelerated to an energy of around 300 volts before injection between the plates 1 and 2.

In operation, ion beam generator 7 produces a beam of stripped nuclei 9 which travels between the plates 1 and 2 and is generally parallel thereto. After beam 9 has been generated and has traveled the length of plates 1 and 2, pulser 3 is activated to produce a voltage pulse which causes an electric field wavefront A to propagate down the length of plates 1 and 2 at the speed of light. The electric field associated with the plates causes the beam 9 to deflect down to the gas jet 20 adjacent plate 2. Due to the propagation of the pulse the ion beam is deflected to impinge on the gas stream at a predetermined position behind the wavefront A, as shown in the FIGURE. As a result, the point of impingement travels longitudinally along the gas jet in coordination with the wavefront A. When the beam strikes the hydrogen gas jet a population inversion results due to the resonant charge exchange of the ions and the hydrogen atoms in the jet. The density of the gas jet is adjusted to maximize one electron pickup in the $2p$ state in a spontaneous decay length, a density of $5 \times 10^{16}$ atoms/cm$^3$ being considered suitable. Preferably, the nozzle 5 is rectangular and the system is operated in vacuum so that the hydrogen density rises within a fraction of a millimeter from vacuum to the nominal density, thereby yielding the desired sharp interface between vacuum and the hydrogen rich region.

The ions from beam 9 will pick up mainly one electron from the hydrogen due to the energy match of $He^{++}$ or $Li^{+++}$. For example, in the case of helium ions, the electron pickup goes mostly (at 25 kev beam energy) as

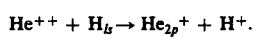

$$He^{++} + H_{ls} \rightarrow He_{2p}^+ + H^+.$$

As the He+ ions encounter the hydrogen gas jet a population inversion results between the $2p$ and $1s$ states of the ion beam and stimulated emission of this 304 A transition is obtained. Since the spontaneous decay time for this transition is 0.10 nanoseconds, the beam must be swept along the gas jet at substantially the speed of light, as is the case in the present embodiment. In this manner, the stimulated emission of the excited atoms travels along the gas jet and is amplified, thereby achieving an "X-ray laser action."

The invention has been described with reference to a particular embodiment, but variations within the spirit and scope of the invention will occur to those skilled in the art. For example, the gas jet may be disposed in a slot in plate 2. Also, while a hydrogen gas jet has been disclosed, it will be appreciated that any suitable gas jet capable of population inversion could be employed.

I claim:

1. Apparatus for generating emission, comprising:
   means for producing a gas jet target capable of population inversion;
   means for generating an ion beam; and
   means for scanning the ion beam along said gas jet so as to impinge thereon and cause emission therefrom, the scanning speed being substantially equal to the wavefront velocity of said emission.

2. An apparatus as defined by claim 1 wherein said gas jet comprises hydrogen gas.

3. An apparatus as defined by claim 2 wherein said ion beam comprises a beam of stripped nuclei.

4. An apparatus as defined by claim 2 wherein said hydrogen gas jet has a density of the order of $5 \times 10^{16}$ atoms/cm$^3$.

5. Apparatus as defined by claim 1 wherein said means for scanning the beam of stripped nuclei comprises first and second transmission line plates aligned parallel to said beam and said gas jet and means for energizing said plates.

* * * * *